United States Patent [19]

Hodosawa et al.

[11] Patent Number: 5,795,506
[45] Date of Patent: Aug. 18, 1998

[54] METHOD AND SYSTEM FOR CONTROLLING MICROCAPSULE PARTICLE DIAMETERS

[75] Inventors: Yoshihito Hodosawa; Hideo Nagano; Hirokazu Saito. all of Shizuoka-ken. Japan

[73] Assignee: Fuji Photo Film Co., Ltd.. Kanagawa. Japan

[21] Appl. No.: 625,131

[22] Filed: Apr. 1, 1996

[30] Foreign Application Priority Data

Mar. 31, 1995 [JP] Japan ................................. 7-075801

[51] Int. Cl.$^6$ .......................... B01J 13/00; B01J 13/02; B01J 13/06; G01N 15/02
[52] U.S. Cl. .................. 264/4.1; 73/865.5; 252/314; 425/5
[58] Field of Search ..................... 252/314; 264/4.1. 264/4; 425/5; 73/865.5

[56] References Cited

U.S. PATENT DOCUMENTS

| | | | |
|---|---|---|---|
| 4,539,139 | 9/1985 | Ichikawa et al. | 252/314 |
| 4,675,140 | 6/1987 | Sparks et al. | 425/5 X |
| 4,817,446 | 4/1989 | Kanamori | 73/865.5 |
| 4,839,093 | 6/1989 | Wenmaekers | 252/314 |
| 5,007,297 | 4/1991 | Sommer | 73/865.5 |
| 5,121,629 | 6/1992 | Alba | 73/865.5 X |
| 5,370,824 | 12/1994 | Nagano et al. | 252/314 |
| 5,405,558 | 4/1995 | Hodosawa et al. | 264/4.1 |

Primary Examiner—Richard D. Lovering
Attorney, Agent, or Firm—Sughrue. Mion. Zinn. Macpeak & Seas. PLLC

[57] ABSTRACT

In a production line for microcapsules, which is provided with an emulsifying machine, an emulsion or microcapsules are automatically sampled on a on-line basis from a portion of a process pipeline, which portion is located downstream of the emulsifying machine. The obtained sample is fed into a particle diameter measuring device, and the particle diameters of the microcapsules in the sample are automatically measured by the particle diameter measuring device. A calculation is made by a process computer in order to find the difference between the measured values of the particle diameters and a desired particle diameter. The value of a rotation speed of the emulsifying machine, which value yields the desired particle diameter, is calculated in accordance with the relationship between the rotation speed of the emulsifying machine and the mean particle diameter, the relationship having been inputted previously. The rotation speed of the emulsifying machine is adjusted in accordance with the calculated value of the rotation speed, and the particle diameters of the microcapsules are thereby controlled.

6 Claims, 4 Drawing Sheets

| # METHOD AND SYSTEM FOR CONTROLLING MICROCAPSULE PARTICLE DIAMETERS

BACKGROUND OF THE INVENTION

1. Field of the Invention

This invention relates to a method and system for automatically measuring and controlling microcapsule particle diameters in a production line for producing microcapsules, which are to be used for pressure-sensitive paper, or the like.

2. Description of the Prior Art

Microcapsules are produced by stirring and emulsifying a raw material mixture in an emulsifying machine. Control of the particle diameter of the emulsified material affects directly upon the quality of the obtained microcapsules and is therefore very important.

However, in the production of microcapsules, the control of the particle diameter of the emulsified material has heretofore been carried out by workers. Specifically, a worker directly samples the emulsion from the production line, conveys the sample of the emulsion to a particle diameter measuring device, and measures the particle diameter of the emulsified material contained in the sample of the emulsion. In accordance with the results of the measurement, the worker carries out the setting and adjustment of the conditions of the production apparatus, particularly the rotation speed and the emulsification time of the emulsifying machine. Therefore, it is not always possible to obtain microcapsules having a desired particle diameter and uniform quality. With such a method, in cases where the production of microcapsules is carried out continuously, the adjustment and control of the particle diameters of the microcapsules cannot be carried out quickly, and deviation from a desired particle diameter cannot be kept small. Accordingly, quality control cannot be carried out appropriately.

A technique for taking out a portion of powder, which is flowing through a production line, on a on-line basis, mixing the powder with a liquid, conveying the resulting mixture to a particle diameter measuring device, and thereby improving the accuracy, with which the particle diameter is measured, has been proposed in, for example, Japanese Unexamined Patent Publication No. 2(1990)-285232. Also, a technique for adjusting the pulverization pressure of a pulverizer in accordance with a measured value of the particle diameter, and thereby controlling the particle diameter of powder has been proposed in, for example, Japanese Unexamined Patent Publication No. 3(1991)-143557.

The proposed on-line sampling techniques for powder is applicable only to powder, i.e. solids. On the other hand, the sampling and the measurement of the particle diameter in the production of microcapsules are concerned with emulsions. Therefore, the proposed on-line sampling techniques for powder cannot be directly applied to the sampling and the measurement of the particle diameter in the production of microcapsules. In particular, with the proposed on-line sampling techniques for powder, it is difficult to carry out appropriate control of the particle diameter in cases where the production line is provided with a continuous emulsifying machine.

Also, ordinarily, an emulsion containing microcapsules is continuously fed through a process pipeline to a next process. However, ordinarily, in cases where the pipe diameter of the process pipeline is determined by considering pressure loss of the process pipeline, or the like, the emulsion flowing through the process pipeline undergoes laminar flow. It has been found that, in the cases of laminar flows, an emulsified material having a large particle diameter is classified to a portion of the flow in the vicinity of the center point of the pipe, and an emulsified material having a small particle diameter is classified to a portion of the flow in the vicinity of the inner wall of the pipe. (Such a phenomenon is referred to as the tubular pinch effect.) Therefore, in cases where a pipe for the sampling is branched from the process pipeline, and the emulsion is sampled from the process pipeline, a sample of uniform particle diameter distribution cannot be obtained. Accordingly, an accurate measurement of the particle diameter of the emulsified material cannot be carried out.

SUMMARY OF THE INVENTION

The primary object of the present invention is to provide a method for automatically measuring and controlling microcapsule particle diameters in production of microcapsules, wherein a desired particle diameter is obtained reliably and with good reproducibility in continuous production of microcapsules.

Another object of the present invention is to provide a system for carrying out the method for automatically measuring and controlling microcapsule particle diameters in production of microcapsules.

The present invention provides a method for automatically measuring and controlling microcapsule particle diameters in production of microcapsules, comprising the steps of, in a production line for microcapsules, which is provided with an emulsifying machine:

i) automatically sampling an emulsion or microcapsules on a on-line basis from a portion of a process pipeline, which portion is located downstream of the emulsifying machine, ii) feeding the obtained sample into a particle diameter measuring device, the particle diameters of the microcapsules in the sample being automatically measured by the particle diameter measuring device, iii) calculating the difference between the measured values of the particle diameters and a desired particle diameter, the calculation being carried out with a process computer, iv) calculating the value of a rotation speed of the emulsifying machine, which value yields the desired particle diameter, in accordance with the relationship between the rotation speed of the emulsifying machine and the mean particle diameter, the relationship having been inputted previously, and v) adjusting the rotation speed of the emulsifying machine in accordance with the calculated value of the rotation speed, whereby the particle diameters of the microcapsules are controlled.

In the step of automatically sampling the emulsion on the on-line basis from the portion of the process pipeline, an in-line mixer should preferably be located at a position immediately upstream from the sampling position in order to stir the emulsion in the process pipeline, and the emulsion having been stirred by the in-line mixer should preferably be sampled.

Also, the method for automatically measuring and controlling microcapsule particle diameters in accordance with the present invention should preferably be modified such that, in the step of measuring the particle diameters of the microcapsules in the sample by the particle diameter measuring device, the particle diameter of a reference sample having an already known particle diameter may be measured with a predetermined timing, a judgment may be made as to whether the deviation between the measured value of the particle diameter of the reference sample and a previously-inputted value of the particle diameter of the reference sample falls or does not fall within a standard range, and calibration of the particle diameter measuring device may thereby be carried out in accordance with the results of the judgment.

The particle diameter measuring device may be of an in-line type and may be directly interposed in the process pipeline. However, such that the measurement accuracy may be kept high, the particle diameter measuring device should preferably be associated with the process pipeline such that the sample may be taken out of the process pipeline and diluted, and the diluted sample may be subjected to the measurement of the particle diameters.

The standard range of the deviation between the measured value of the particle diameter of the reference sample and the previously-inputted value of the particle diameter of the reference sample, which range is utilized in the calibration of the particle diameter measuring device, may be set arbitrarily. As the reference sample, standard particles of a polystyrene latex, or the like, which is available commercially, may be utilized. Alternatively, as the reference sample, a sample of microcapsules, the particle diameters of which have been measured previously by a different particle diameter measuring device, that is based upon a principle different from the principle of the on-line particle diameter measuring device, may be utilized.

Further, in cases where the deviation between the measured value of the particle diameter of the reference sample and the previously-inputted value of the particle diameter of the reference sample is large, the calibration of the particle diameter measuring device may be carried out automatically. Furthermore, the calibration may be carried out arbitrarily regardless of the set cumulative number of on-line measurements.

The present invention also provides a system for automatically measuring and controlling microcapsule particle diameters in production of microcapsules, the system comprising, provided in a production line for microcapsules, which is provided with an emulsifying machine for stirring and emulsifying a mixture liquid having been fed into a process pipeline:

i) a sampling device for automatically sampling the emulsion, which contains microcapsules, on a on-line basis from a portion of the process pipeline, which portion is located downstream of the emulsifying machine, the emulsion being sampled from a middle region in the pipe of the process pipeline, ii) an in-line mixer located in a portion of the process pipeline, which portion is located at a position immediately upstream of the sampling device, the in-line mixer stirring and mixing a portion of the emulsion, which is located in a middle region within the pipe of the process pipeline, and a portion of the emulsion, which is located in a peripheral region within the pipe of the process pipeline, together, iii) a particle diameter measuring device for measuring the particle diameters of the microcapsules, which are contained in the emulsion having been sampled by the sampling device, and iv) a process computer for calculating a desired value of a rotation speed of the emulsifying machine in accordance with the difference between the measured values of the particle diameters, which measured values have been obtained from the particle diameter measuring device, and a desired particle diameter, the process computer generating a control signal in accordance with the calculated value of the rotation speed of the emulsifying machine and feeding out the control signal to the emulsifying machine.

The system for automatically measuring and controlling microcapsule particle diameters in accordance with the present invention should preferably further comprise a reference sample feeding apparatus for feeding a reference sample, the particle diameter of which is already known, into the particle diameter measuring device, and a process computer provided with a calibration means for calculating the deviation between the measured value of the particle diameter of the reference sample, which measured value has been obtained from the particle diameter measuring device, and a previously-inputted value of the particle diameter of the reference sample, making a judgment as to whether the deviation falls or does not fall within a standard range, and calibrating the particle diameter measuring device in accordance with the results of the judgment.

With the method and the system for automatically measuring and controlling microcapsule particle diameters in accordance with the present invention, while the emulsion is being prepared by the emulsifying machine in the production line for the microcapsules, the emulsion obtained from the emulsifying machine is sampled on the on-line basis, and the particle diameters of the microcapsules contained in the sampled emulsion are measured automatically. The process computer receives the information representing the measured values of the particle diameters of the microcapsules. The process computer compares the measured values of the particle diameters of the microcapsules and the desired value of the particle diameter with each other and carries out the feedback control of the emulsifying machine in accordance with the results of the comparison. Therefore, the microcapsules having the desired particle diameters can be produced quickly and reliably. Also, continuous production of the microcapsules having the desired particle diameters, which are to be used for pressure-sensitive paper, or the like, can be carried out without being adversely affected by a change in the liquid temperature, viscosity, or the like, and without particular operations of the workers being required.

Further, the in-line mixer is located at the position immediately upstream of the position, at which the emulsion is sampled. The in-line mixer eliminates the classification of the microcapsules having different particle diameters in the emulsion within the process pipeline such that a representative sample can be taken out. By the stirring with the in-line mixer, the distribution of the particle diameters of the microcapsules can be rendered uniform, the adverse effects of the classification in the pipe can be eliminated, and the representative sample can thereby be obtained. Therefore, accurate particle diameters of the microcapsules contained in the emulsion can be measured.

Furthermore, by the provision of the calibration means for automatically calibrating the particle diameter measuring device, accurate results of measurement can always be obtained, and the reliability of the method and the system in accordance with the present invention can be kept high.

DESCRIPTION OF THE PREFERRED EMBODIMENTS

The present invention will hereinbelow be described in further detail with reference to the accompanying drawings.

Figure 1:
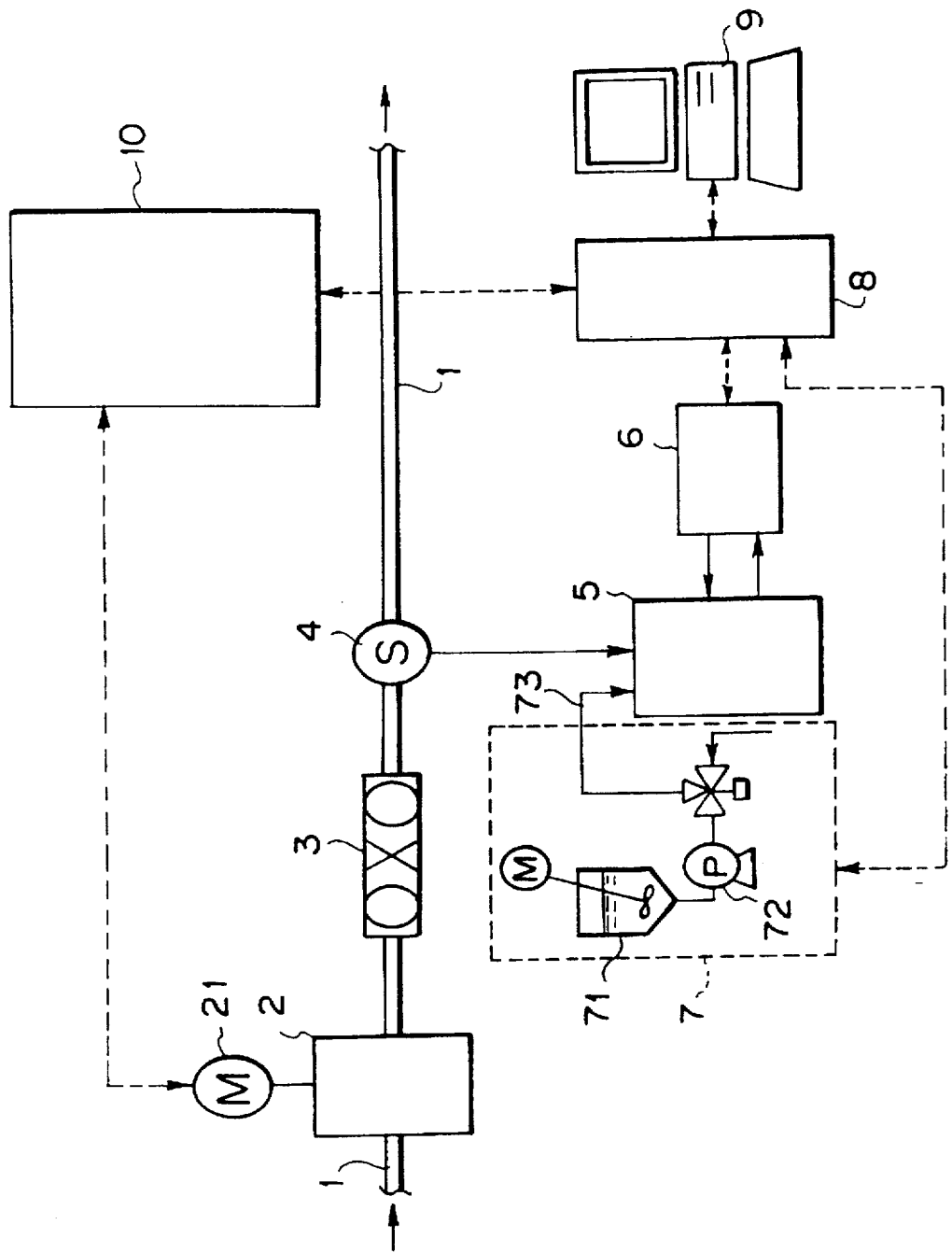
FIG. 1 is a flow diagram showing an embodiment of the system for automatically measuring and controlling microcapsule particle diameters in a continuous emulsification type of microcapsule producing line.

FIG. 1 is a flow diagram showing an embodiment of the system for automatically measuring and controlling microcapsule particle diameters in a continuous emulsification type of producing line for producing the microcapsules for use in pressure-sensitive paper.

In the microcapsule producing line, a mixture liquid containing composition materials is fed through a process pipeline 1 into an emulsifying process. In the emulsifying process, the process pipeline 1 is provided with a continuous emulsifying machine 2, an in-line mixer 3, and a sampling device 4, which are located in this order and on the on-line basis. Also, a sample diluting and dispersing tank 5, a particle diameter measuring device 6, a reference sample feeding apparatus 7, a sequence control unit 8, and a personal computer 9 are located on the side outward from the process pipeline 1. Further, a process computer 10 is provided which carries out the process control of the entire microcapsule producing line.

The continuous emulsifying machine 2 stirs and emulsifies the mixture liquid supplied from the process pipeline 1. The continuous emulsifying machine 2 is provided with a rotor (not shown), which is rotated by a motor 21. The particle diameter of the emulsified material, i.e. the microcapsules, changes in accordance with the rotation speed of the continuous emulsifying machine 2. The emulsified material has the characteristics such that, when the rotation speed of the continuous emulsifying machine 2 increases, the particle diameter of the emulsified material may become small. By way of example, as the continuous emulsifying machine 2, a colloid mill supplied by Nippon Seiki Seisakusho K.K. may be utilized.

The in-line mixer 3 is interposed in the process pipeline 1. The in-line mixer 3 mixes and uniforms the emulsion, which has been obtained from the continuous emulsifying machine 2 and flows through the process pipeline 1, such that the classification of the microcapsules to the middle region and the peripheral region in the pipe may be eliminated. As the in-line mixer 3, a mixer is selected and set such that the particle diameter of the emulsified material may not be rendered small due to the mixing operation. The in-line mixer 3 is located at the position immediately upstream of the sampling device 4. By way of example, as the in-line mixer 3, a static mixer supplied by Noritake Co., Ltd. or a pipeline homomixer supplied by Tokushu Kika Kogyo K.K. may be utilized. Any of static types of mixers and dynamic types of mixers, which do not render the particle diameter small, may be utilized.

The sampling device 4 takes the emulsion, which has been stirred by the in-line mixer 3, out of the process pipeline 1. By way of example, as the sampling device 4, a tube pump type of sampling device is utilized.

The emulsion having been sampled by the sampling device 4 is fed into the sample diluting and dispersing tank 5 and is then fed from the sample diluting and dispersing tank 5 into the particle diameter measuring device 6. In cases where the particle diameter measuring device 6 is to be calibrated, a reference sample is fed from the reference sample feeding apparatus 7 into the particle diameter measuring device 6 via the sample diluting and dispersing tank 5. The particle diameter measuring device 6 measures the particle diameters of a predetermined number of the microcapsules, which are contained in the received emulsion. Also, the particle diameter measuring device 6 automatically calculates the mean particle diameter. By way of example, as the particle diameter measuring device 6, MICROTRAC supplied by LEEDS & NORTHRUP Co. may be utilized.

The reference sample feeding apparatus 7 is provided with a storage tank 71 for storing the reference sample, a pump 72 for sucking the reference sample from the storage tank 71 and delivering it, and a syringe 73 for introducing the reference sample into an inlet of the sample diluting and dispersing tank 5. As the reference sample stored in the storage tank 71 of the reference sample feeding apparatus 7, it is possible to utilize a commercially available emulsion for calibration or an emulsion, the particle diameter of which has been measured with a different particle diameter measuring device and is thus already known.

The particle diameter measuring device 6 and the reference sample feeding apparatus 7 are controlled by the sequence control unit 8. The time series control is carried out in accordance with commands given from the personal computer 9 and the process computer 10. The information representing the measured value, which has been obtained from the particle diameter measuring device 6, is fed into the process computer 10 via the sequence control unit 8. Also, a control signal for controlling the rotation speed of the motor 21 of the continuous emulsifying machine 2 is given from the process computer 10 to the motor 21. In this manner, feedback control of the particle diameters of the microcapsules contained in the emulsion is carried out.

Figure 2:
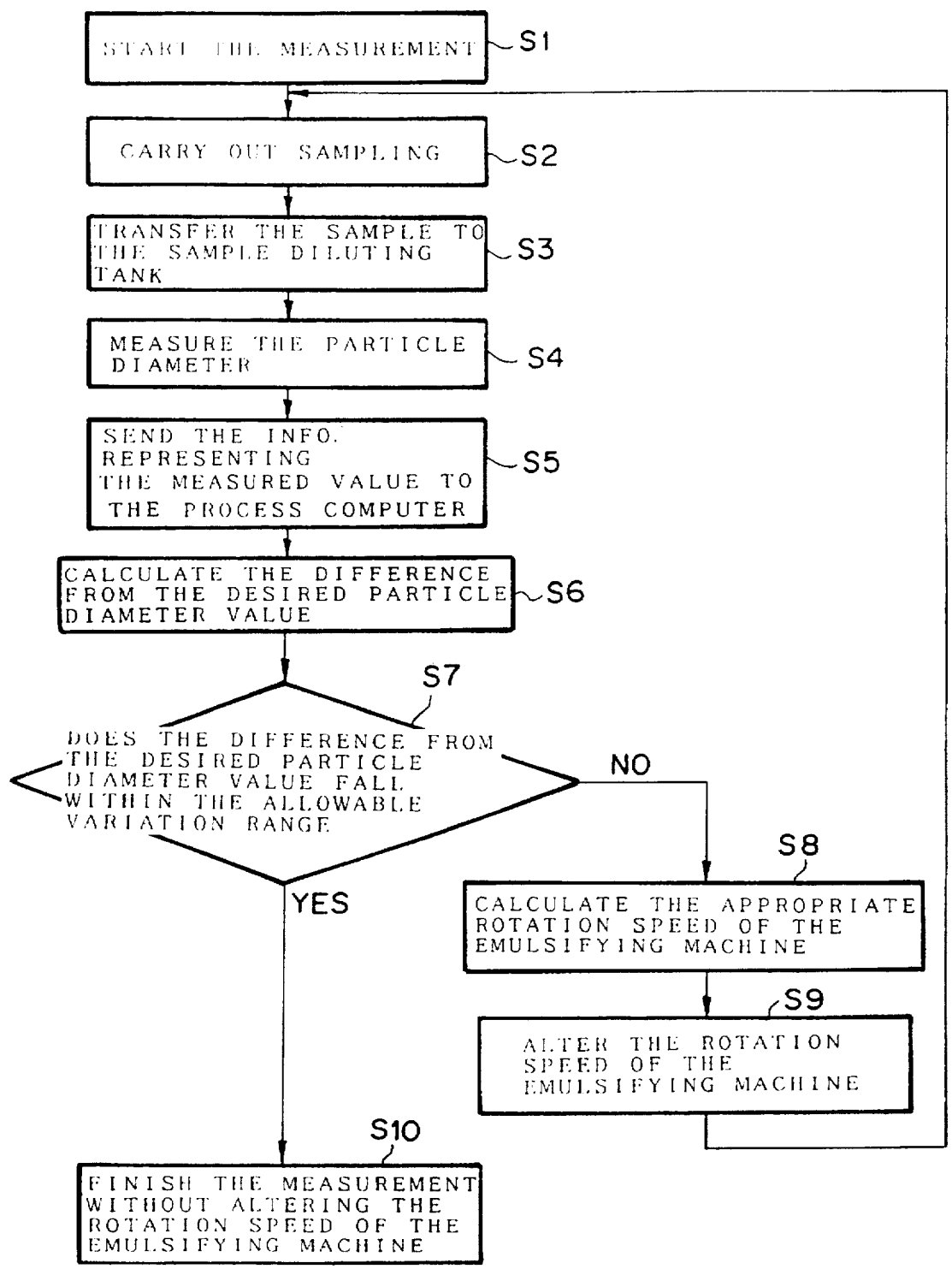
FIG. 2 is a flow chart showing how the measurement and control are carried out.

How the feedback control of the rotation speed of the continuous emulsifying machine 2 is carried out will be described hereinbelow with reference to FIG. 2. With reference to FIG. 2, in a step S1, a measurement start signal is given from the process computer 10 to the sequence control unit 8 at set measurement intervals (e.g. 10 minutes) and in accordance with the timing, with which the production conditions, such as an emulsification flow rate, are altered. In a step S2, in accordance with the given measurement start signal, the sampling device 4 automatically samples the emulsion, which has been obtained from the continuous emulsifying machine 2 and has passed through the in-line mixer 3. In a step S3, the sampled emulsion is transferred into the sample diluting and dispersing tank 5. Thereafter, in a step S4, the particle diameters of the microcapsules contained in the sampled emulsion are measured by the particle diameter measuring device 6.

In a step S5, the information representing the measured values of the particle diameters of the microcapsules contained in the sampled emulsion is transmitted to the process computer 10. In a step S6, the process computer 10 calculates the deviation between the measured values and a desired particle diameter value. Also, in a step S7, a judgment is made as to whether the deviation between the measured values and the desired particle diameter value falls or does not fall within an allowable variation range. In cases where the deviation is judged to be beyond the allowable variation range in the step S7, in a step S8, an appropriate rotation speed of the continuous emulsifying machine 2 is calculated from the deviation between the measured values and the desired particle diameter value and in accordance with the relationship between the rotation speed of the emulsifying machine and the particle diameter value, which relationship has been inputted previously. In a step S9, in accordance with the results of the calculation of the appropriate rotation speed, a drive signal is sent from the process computer 10 to the motor 21, and the rotation speed of the continuous emulsifying machine 2 is thereby altered. Thereafter, the procedure returns to the step S2, and the sampling of the emulsion is carried out. In this manner, feedback control is carried out such that the rotation speed of the continuous emulsifying machine 2 may become appropriate.

As described above, the rotation speed of the continuous emulsifying machine 2 is controlled in accordance with the deviation between the measured values of the particle diameters and the desired particle diameter value. When the deviation is judged in the step S7 to be within the allowable variation range as a result of the control, the procedure proceeds to a step S10, and the measurement is finished.

In the manner described above, the measurement of the particle diameters is automatically carried out on the on-line basis on the sample having uniform particle diameter distribution, and the rotation speed of the continuous emulsifying machine 2 is controlled. Therefore, even if the particle diameters of the microcapsules change due to a change in the liquid temperature, viscosity, or the like, the particle diameters can be stabilized quickly. The microcapsules for pressure-sensitive paper can thus be produced continuously. The time series change in the particle diameter is displayed on the display device of the personal computer 9, and the corresponding information is stored on a floppy disk.

Figure 3:
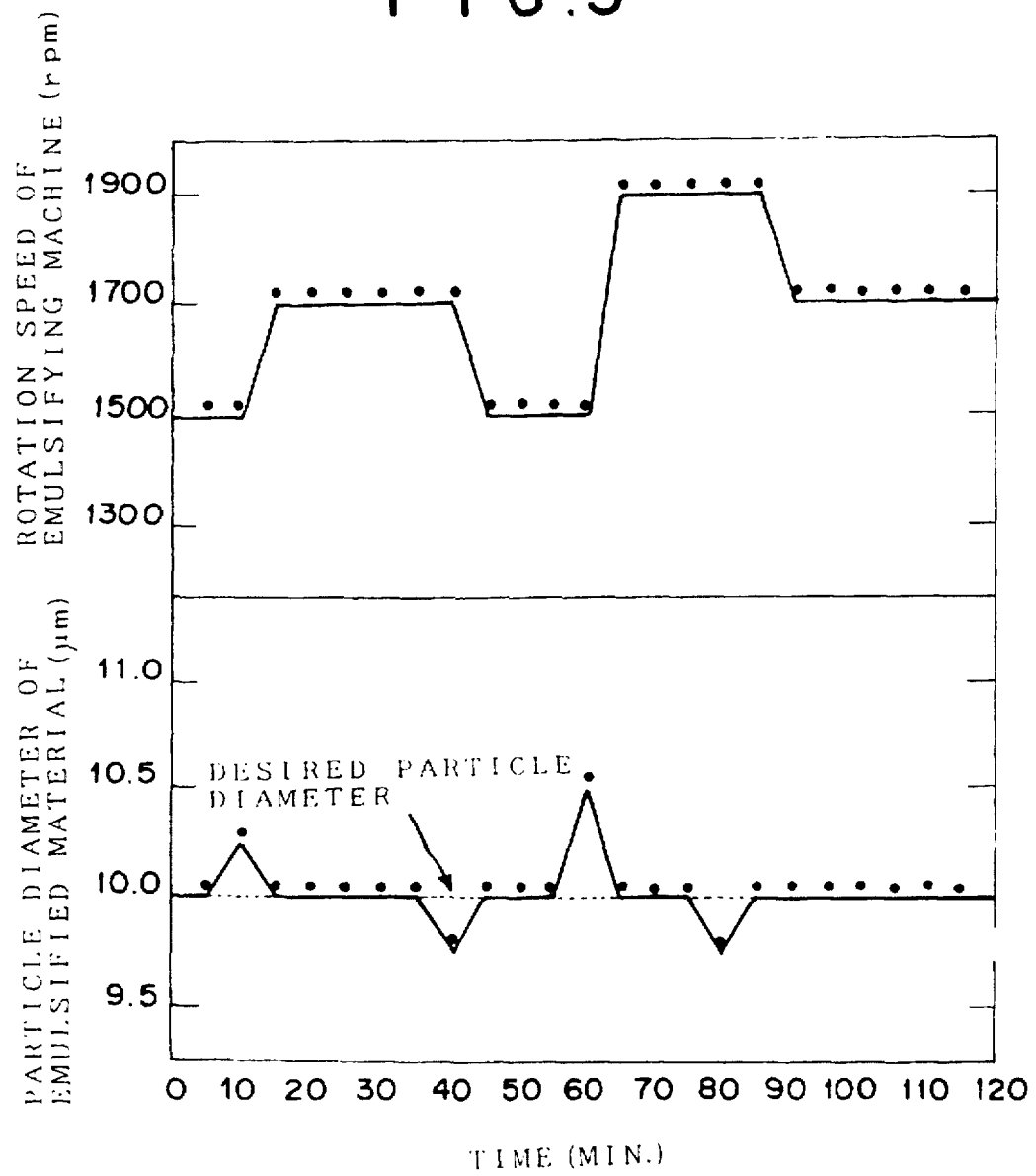
FIG. 3 is a graph showing an example of change in measured values of particle diameters after time lapse and change in the rotation speed of an emulsifying machine after time lapse and FIG. 4 is a flow chart showing how calibration is carried out by an automatic calibration means for a particle diameter measuring device.

FIG. 3 is a graph showing an example of change in measured values of particle diameters after time lapse and change in the rotation speed of the emulsifying machine after time lapse. In this example, the emulsion is sampled at five-minute intervals, and the particle diameter is measured. The desired particle diameter is 10.0 µm. In cases where the measured values of the particle diameters become larger than the desired particle diameter, the rotation speed of the continuous emulsifying machine 2 is increased such that the particle diameters may become small. In cases where the measured values of the particle diameters become smaller than the desired particle diameter, the rotation speed of the continuous emulsifying machine 2 is decreased. Also, in cases where the deviation of the particle diameters is large, the width of the alteration of the rotation speed of the continuous emulsifying machine 2 is increased such that the response speed may become high and the particle diameters may quickly converge to the desired particle diameter.

Figure 4:
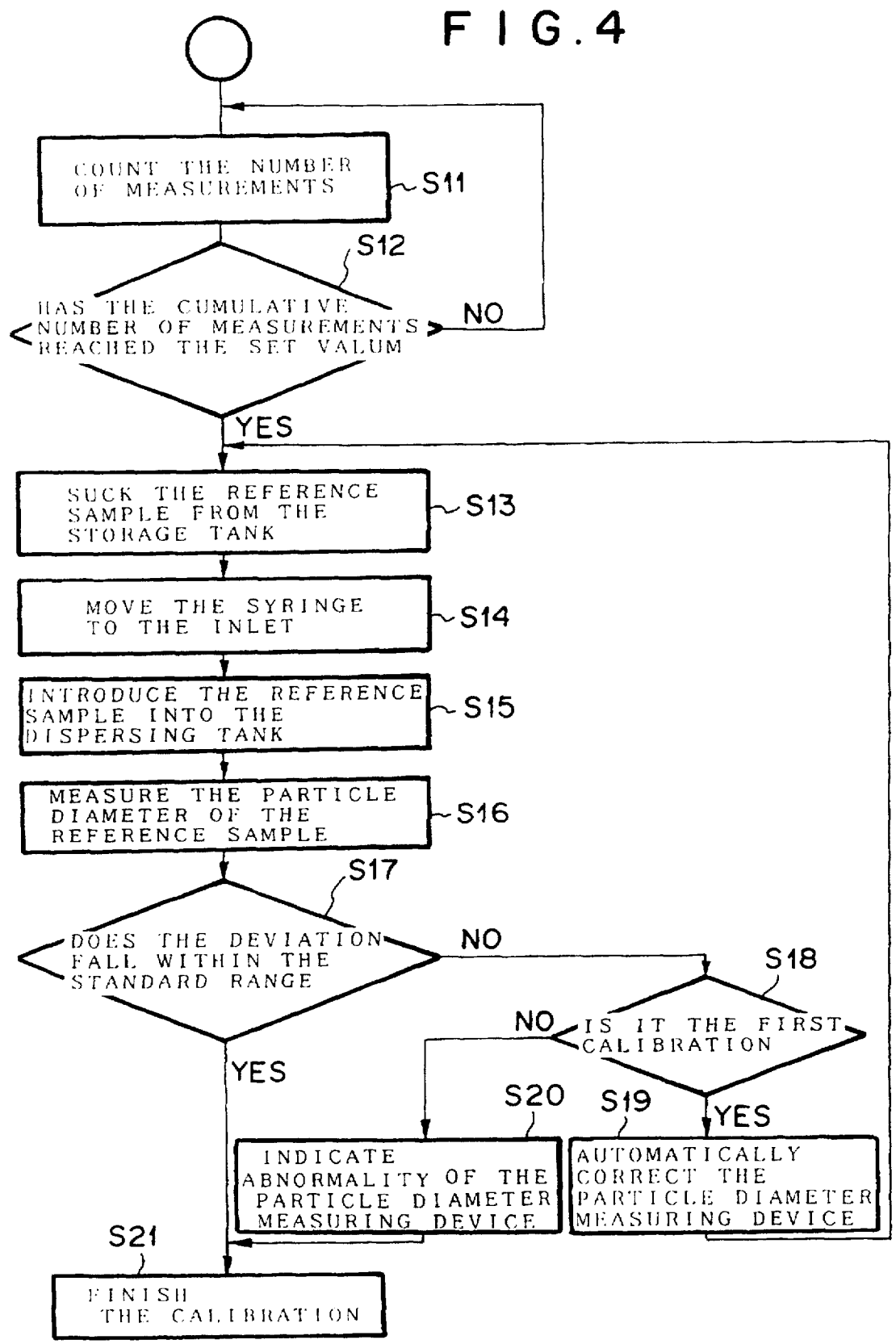

In the control of the rotation speed of the continuous emulsifying machine 2 in accordance with the measurement of the particle diameters in the emulsion, when the number of measurements having been carried out by the particle diameter measuring device 6 reaches a set value (e.g. 200 measurements), the automatic calibration means for the particle diameter measuring device 6 is activated. FIG. 4 is a flow chart showing how the calibration is carried out by the automatic calibration means for the particle diameter measuring device 6. Specifically, in a step S11, the number of measurements of the particle diameters having been carried out by the particle diameter measuring device 6 is counted. In a step S12, a judgment is made as to whether the cumulative number of measurements reaches or does not reach the set value.

When the number of measurements having been carried out reaches the set value, the procedure proceeds to a step S13. In the step S13, the reference sample is sucked from the storage tank 71. Also, in a step S14, the syringe 73 is moved to the inlet of the sample diluting and dispersing tank 5. Further, in a step S15, the reference sample is introduced into the sample diluting and dispersing tank 5. Thereafter, in a step S16, the particle diameter of the reference sample is measured by the particle diameter measuring device 6.

The particle diameter of the reference sample has been previously measured by a different particle diameter measuring device (e.g., COULTER COUNTER TAII supplied by COULTER Co.), which is based upon a principle different from the principle of the particle diameter measuring device 6. The calibration information representing the measured value of the particle diameter of the reference sample has been inputted into the personal computer 9. In a step S17, the deviation between the measured value of the reference sample, which has been obtained in the step S16, and the inputted calibration information is calculated. Also, a judgment is made as to whether the deviation falls or does not fall within a standard range. In a step S21, in cases where the deviation is judged to be within the standard range, the calibration is finished.

In a step S18, in cases where the deviation between the measured value of the reference sample, which has been obtained in the step S16, and the inputted calibration information is judged to be beyond the standard range in the step S17, a judgment is made as to whether the calibration is or is not the first calibration. In a step S19, in cases where the calibration is judged to be the first calibration, the particle diameter measuring device 6 is automatically corrected. With the automatic correction, the measurement characteristics are corrected such that the calibration information may coincides with the measured value. After the particle diameter measuring device 6 has thus been corrected automatically, the procedure returns to the step S13, and measurement of the reference sample is carried out again. In cases where the deviation between the measured value of the reference sample, which has thus been obtained, and the inputted calibration information is judged to be within the standard range in the step S17, the calibration is finished.

However, in cases where the deviation between the measured value of the reference sample, which has thus been obtained, and the inputted calibration information is again judged to be beyond the standard range in the step S17, the calibration is judged not to be the first calibration in the step S18. In such cases, in a step S20, the particle diameter measuring device 6 is indicated to be abnormal, and the calibration is finished.

In the embodiment described above, wherein the mixture liquid fed through the process pipeline 1 is emulsified by the continuous emulsifying machine 2 and the particle diameter of the emulsified material (i.e., the microcapsules) is controlled by the adjustment of the rotation speed of the continuous emulsifying machine 2, the emulsion obtained from the continuous emulsifying machine 2 is sampled by the sampling device 4. The particle diameters of the microcapsules contained in the sampled emulsion are automatically measured by the particle diameter measuring device 6. Also, the rotation speed of the continuous emulsifying machine 2 is controlled in accordance with the deviation between the measured values of the particle diameters of the microcapsules and the desired particle diameter, such that the particle diameters of the microcapsules may become equal to the desired particle diameter. In this manner, the microcapsules having stable particle diameters are produced. Further, in the step of sampling the emulsion from the process pipeline 1, the microcapsules contained in the process pipeline 1 are stirred and rendered uniform by the in-line mixer 3, which is located at the position immediately upstream of the sampling device 4. The adverse effects of the classification of the microcapsules flowing as the laminar flow through the process pipeline 1 are thereby eliminated, and accurate measurement of the particle diameters is carried out.

Moreover, the reference sample is fed into the particle diameter measuring device 6, and the correction and the calibration of the measurement characteristics of the particle diameter measuring device 6 are carried out automatically. The measurement accuracy and the reliability of the particle diameter measuring device 6 are thus kept high, such that the microcapsules having the desired particle diameters can be produced accurately and reliably.

What is claimed is:

1. A method for automatically measuring and controlling microcapsule particle diameters during production of microcapsules in a production line provided with an emulsifying machine, comprising the steps of:

i) automatically sampling the microcapsules on an on-line basis from a portion of a process pipeline, which portion is located downstream from the emulsifying machine, ii) feeding the obtained sample into a particle diameter measuring device, iii) measuring the particle diameters of the microcapsules in the sample using said particle diameter measuring device, iv) calculating a difference between the measured values of the particle diameters and a desired particle diameter, the calculation being carried out using a process computer, v) calculating a value of a rotation speed of the emulsifying machine, which value yields said desired particle diameter, in accordance with a relationship between the rotation speed of the emulsifying machine and a mean particle diameter, said relationship having been previously input, and vi) adjusting the rotation speed of the emulsifying machine in accordance with the calculated value of the rotation speed, whereby the particle diameters of the microcapsules are controlled.

2. A method as defined in claim 1 wherein, in the step of automatically sampling the microcapsules on the on-line basis from the portion of the process pipeline, an in-line mixer is located at a position immediately upstream from the sampling position in order to stir the microcapsules in the process pipeline, wherein the microcapsules having been stirred by said in-line mixer are sampled.

3. A method as defined in claim 2 wherein, in the step of measuring the particle diameters of the microcapsules in the sample by said particle diameter measuring device, a particle diameter of a reference sample having a known particle diameter is measured with a predetermined timing, a judgment is made as to whether a deviation between the measured value of the particle diameter of the reference sample and a previously-input value of the particle diameter of the reference sample falls or does not fall within a standard range, and calibration of said particle diameter measuring device is thereby carried out in accordance with the results of the judgment.

4. A method as defined in claim 1 wherein, in the step of measuring the particle diameters of the microcapsules in the sample by said particle diameter measuring device, a particle diameter of a reference sample having a known particle diameter is measured with a predetermined timing, a judgment is made as to whether a deviation between the measured value of the particle diameter of the reference sample and a previously-input value of the particle diameter of the reference sample falls or does not fall within a standard range, and calibration of said particle diameter measuring device is thereby carried out in accordance with the results of the judgment.

5. A system for automatically measuring and controlling microcapsule particle diameters during production of microcapsules in a production line provided with an emulsifying machine for stirring and emulsifying a mixture liquid having been fed into a process pipeline, the system comprising:

i) a sampling device for automatically sampling the emulsion, which contains the microcapsules, on an on-line basis from a portion of the process pipeline, which portion is located downstream from the emulsifying machine, the microcapsules being sampled from a middle region in a pipe of the process pipeline, ii) an in-line mixer located in a portion of the process pipeline, which portion is located at a position immediately upstream of said sampling device, said in-line mixer stirring and mixing a portion of the microcapsules, which is located in a middle region within the pipe of the process pipeline, and a portion of the microcapsules, which is located in a peripheral region within the pipe of the process pipeline, together, iii) a particle diameter measuring device for measuring the particle diameters of the microcapsules, which are contained in the emulsion having been sampled by said sampling device, and iv) a process computer for calculating a desired value of a rotation speed of the emulsifying machine in accordance with a difference between the measured values of the particle diameters, which measured values have been obtained from said particle diameter measuring device, and a desired particle diameter, said process computer generating a control signal in accordance with the calculated desired value of the rotation speed of the emulsifying machine and feeding out the control signal to the emulsifying machine.

6. A system as defined in claim 5 wherein the system further comprises a reference sample feeding apparatus for feeding a reference sample, the particle diameter of which is known, into said particle diameter measuring device, and wherein said process computer is provided with a calibration means for calculating a deviation between a measured value of the particle diameter of the reference sample, which measured value has been obtained from said particle diameter measuring device, and a previously-input value of the particle diameter of the reference sample, making a judgment as to whether the deviation falls or does not fall within a standard range, and calibrating said particle diameter measuring device in accordance with the results of the judgment.

* * * * *